US009446448B2

(12) United States Patent
McCoy et al.

(10) Patent No.: US 9,446,448 B2
(45) Date of Patent: Sep. 20, 2016

(54) RECOATERS FOR POWDER-LAYER THREE-DIMENSIONAL PRINTERS

(71) Applicant: The ExOne Company, North Huntingdon, PA (US)

(72) Inventors: Michael John McCoy, Murrysville, PA (US); Anthony S. Dugan, McKeesport, PA (US)

(73) Assignee: The ExOne Company, North Huntingdon, PA (US)

( * ) Notice: Subject to any disclaimer, the term of this patent is extended or adjusted under 35 U.S.C. 154(b) by 0 days.

(21) Appl. No.: 14/945,884

(22) Filed: Nov. 19, 2015

(65) Prior Publication Data

US 2016/0151840 A1    Jun. 2, 2016

Related U.S. Application Data

(60) Provisional application No. 62/086,423, filed on Dec. 2, 2014.

(51) Int. Cl.
*B29C 67/00*  (2006.01)
*B22F 3/105*  (2006.01)
*B33Y 30/00*  (2015.01)

(52) U.S. Cl.
CPC .............. *B22F 3/1055* (2013.01); *B33Y 30/00* (2014.12)

(58) Field of Classification Search
CPC .......... B29C 67/0077; B29C 67/0085; B28B 13/0215; B28B 13/022; B28B 13/023; B28B 13/026; B65D 88/26; B65D 88/28; B07B 1/00; B07B 1/28; B65B 37/04; B22F 3/1055; B22F 3/1056
USPC ............. 425/174.4, 578, 579, 580; 264/497; 209/240, 244, 245
See application file for complete search history.

(56) References Cited

U.S. PATENT DOCUMENTS

| | | | | |
|---|---|---|---|---|
| 6,136,257 A * | 10/2000 | Graf | ........................ | B22F 3/004 118/308 |
| 6,799,959 B1 * | 10/2004 | Tochimoto | .............. | B29C 41/12 425/130 |
| 7,597,835 B2 * | 10/2009 | Marsac | ............... | B29C 67/0055 264/112 |
| 8,915,730 B2 * | 12/2014 | Matsui | ................ | B29C 67/0059 264/401 |
| 2001/0045678 A1 * | 11/2001 | Kubo | ...................... | B29C 41/36 264/37.29 |
| 2002/0090313 A1 * | 7/2002 | Wang | ...................... | B22F 3/004 419/10 |
| 2002/0105114 A1 * | 8/2002 | Kubo | .................. | B29C 67/0077 264/497 |
| 2004/0035542 A1 * | 2/2004 | Ederer | ...................... | B22C 7/00 164/45 |

(Continued)

FOREIGN PATENT DOCUMENTS

WO    WO 2011064725 A1 *  6/2011    ......... B29C 67/0077

*Primary Examiner* — Timothy Kennedy
(74) *Attorney, Agent, or Firm* — Thomas Lizzi

(57) ABSTRACT

Recoaters for powder-layer three-dimensional printers which are capable of producing enhanced powder layer uniformity and powder-layer three-dimensional printers having such recoaters are described. The recoater comprises a bridge, two supports, one at either end of the bridge, a powder reservoir, and a substantially rectangular plate which extends between the two supports and contains an opening through which the powder reservoir either extends into or through or through which build powder can be fed into the powder reservoir. The plate has a length to minimum width ratio of no more than about 7.0 and a length to maximum width ratio of no more than about 5.0, the plate being adapted to brace the bridge into a perpendicular relationship with the first and second supports when the recoater is being controllably moved and the powder reservoir is dispensing powder to form a powder layer.

6 Claims, 3 Drawing Sheets

(56) References Cited

U.S. PATENT DOCUMENTS

| | | | | |
|---|---|---|---|---|
| 2004/0239009 A1* | 12/2004 | Collins | ............... | B29C 67/0077 264/497 |
| 2006/0219315 A1* | 10/2006 | Cox | ....................... | B65G 53/22 141/67 |
| 2007/0074659 A1* | 4/2007 | Wahlstrom | .......... | B29C 67/0066 118/679 |
| 2008/0006334 A1* | 1/2008 | Davidson | ............ | B29C 67/0077 137/571 |
| 2010/0031882 A1* | 2/2010 | Abe | .................... | B29C 67/0077 118/620 |
| 2014/0175708 A1* | 6/2014 | Echigo | ................ | B29C 67/0077 264/460 |
| 2015/0231832 A1* | 8/2015 | Shi | ....................... | B29C 67/0096 425/226 |

* cited by examiner

RECOATERS FOR POWDER-LAYER THREE-DIMENSIONAL PRINTERS

BACKGROUND

1. Field of the Invention

The present invention relates to an improved recoater for a powder-layer three-dimensional printer. The present invention also relates to powder-layer three-dimensional printers having such improved recoaters.

2. Background of the Art

There are today various types of three-dimensional printers, i.e. devices that convert electronic representations of three-dimensional articles into the articles themselves by the systematic building-up of one or more materials. The present invention relates to the types of three-dimensional printers which create three-dimensional articles by selectively binding together preselected areas of successively deposited layers of powder. These types of three-dimensional printers are referred to herein as "powder-layer three-dimensional printers" because the construction of the three-dimensional article by such printers utilizes layers of powders as a build material. Examples of such types of powder-based three-dimensional printers include, without limitation, the binder-jet three-dimensional printers, the selective sintering three-dimensional printers, and the electron beam melting three-dimensional printers.

It is to be understood that the term "powder" is also sometimes referred to in the art as "particulate material" or "particles" and the term "powder" is to be construed herein as meaning any such material, by whatever name, that is used in such three-dimensional printers as a layer-forming material. Powder may comprise any type of material capable of taking on the powder form, e.g. metal, plastics, ceramics, carbon, graphite, composite materials, minerals, etc., and combinations thereof. The term "build powder" is used herein to refer to a powder which is used to form the powder layers and from which the article is built in a powder-layer three-dimensional printer.

During the operation of a powder-layer three-dimensional printer, a first layer of a build powder is deposited upon a vertically indexible build platform and then successive powder layers are deposited one at a time upon the first powder layer. Selected portions of selected powder layers are treated to bind the powders in those portions together as the three-dimensional article is formed. Collectively, the portions of the deposited powder layers which are not bound together are referred to herein as a "powder bed."

In some powder-layer three-dimensional printers, each powder layer is formed by transferring a predetermined quantity of build powder from an open-top stationary powder reservoir by first indexing upward a platform which supports the powder within the reservoir a predetermined amount to raise the predetermined quantity above the reservoir walls and then pushing that quantity of powder across the top of the build platform or the powder bed to form a powder layer. In some powder-layer three-dimensional printers, each powder layer is deposited upon the build platform or the extant powder bed by a traveling powder dispenser, which may or may not include some device which is adapted to level the top of the powder layer.

The process of forming a powder layer is sometimes referred to in the art, and is referred to herein, as "recoating." The device or combination of devices of a particular powder-layer three-dimensional printer that accomplishes the recoating is sometimes referred to in the art, and is referred to herein, as a "recoater."

Although the recoaters existing in the art today generally work well for their intended purposes, there is still a need in the art to develop recoaters which provide greater powder layer uniformity, especially when the base material density of the powder is high. The present invention makes such an improvement.

SUMMARY OF THE INVENTION

The present invention provides a recoater for a powder-layer three-dimensional printer which is capable of producing enhanced powder layer uniformity. The recoater of the present invention comprises a bridge and two supports, one at either end of the bridge. The recoater also has a powder reservoir which is adapted to contain a build powder and to selectively dispense the build powder during the layer formation process. The recoater also has a substantially rectangular plate which extends between the two supports and contains an opening through which the powder reservoir either extends into or through which build powder can be fed into the powder reservoir. The plate has a length to minimum width ratio of no more than about 7.0 and a length to maximum width ratio of no more than about 5.0, the plate being adapted to brace the bridge into a perpendicular relationship with the first and second supports when the recoater is being controllably moved and the powder reservoir is dispensing powder to form a powder layer. The inventive recoater was found by the inventors to provide the surprising result of improving the uniformity of the powder layer deposited by the recoater when the build powder comprises a material having a high native density.

The present invention also includes powder-layer three-dimensional printers which comprise a recoater such as described in the previous paragraph.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1:
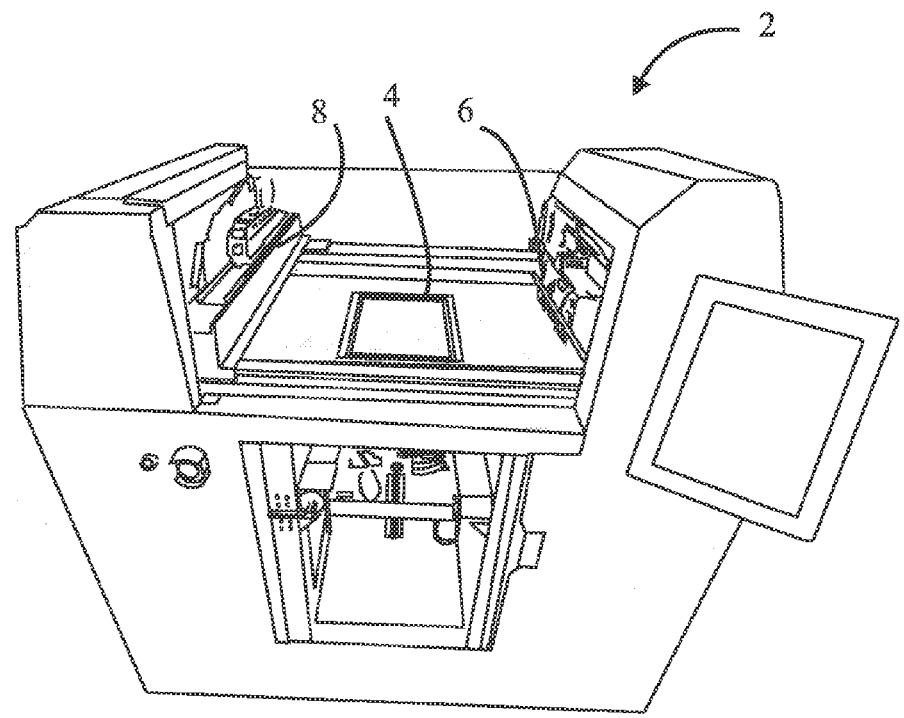
FIG. 1 is a schematic perspective view of a powder-layer three-dimensional printer 2 embodiment.

In this section, some preferred embodiments of the present invention are described in detail sufficient for one skilled in the art to practice the present invention without undue experimentation. It is to be understood, however, that the fact that a limited number of preferred embodiments are described herein does not in any way limit the scope of the present invention as set forth in the claims. It is to be understood that whenever a range of values is described herein or in the claims that the range includes the end points and every point therebetween as if each and every such point had been expressly described. Unless otherwise stated, the word "about" as used herein and in the claims is to be construed as meaning the normal measuring and/or fabrication limitations related to the value which the word "about" modifies. Unless expressly stated otherwise, the term "embodiment" is used herein to mean an embodiment of the present invention.

The present invention relates to recoaters for powder-layer three-dimensional printers and to powder-layer three-dimensional printers having the inventive recoaters described herein. Although the invention includes all types of powder-layer three-dimensional printers, for the sake of conciseness, the only type of powder-layer three-dimensional printers that will be discussed in this section are those of the binder-jetting three-dimensional printer type. The binder-jetting three-dimensional printers are also sometimes in the art referred to as "three-dimensional inkjet printers" because the binder jetting is done using a print head that resembles those developed for inkjet printing. The basic binder jetting three-dimensional printing process was invented 1980's and developed in the 1990's at the Massachusetts Institute of Technology and is described in several United States patents, including the following U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al.

Referring to FIG. 1, there is shown a schematic perspective view of a powder-layer three-dimensional printer 2 embodiment. The printer 2 includes a removable build box 4 (only the top surfaces of which are visible in FIG. 1) having a vertically indexable floor, a recoater 6, and a selectively positionable printing device 8. During the operation of the printer 2, after the recoater 6 has deposited one or more layers, the printing device 8 imparts the image of a slice of the article or articles which are to be printed by selectively printing a binder onto the uppermost deposited powder layer. The floor of the build box 4 is indexed downward to receive each next layer deposited by the recoater 6. The process of layer deposition and printing is continued until all of the desired article or articles have been printed.

Figure 2:
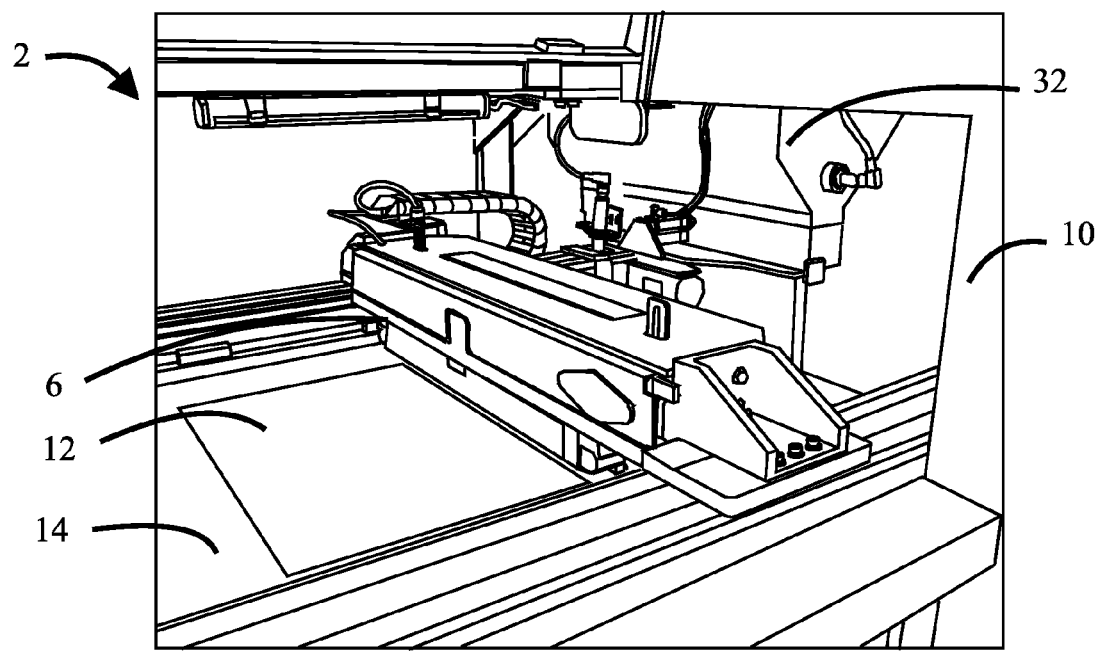
FIG. 2 is a perspective view of a detail of the powder-layer three-dimensional printer of FIG. 1.

FIG. 2 shows a perspective view of a detail of the printer 2 showing a part of the housing 10 of the printer 2 framing the view into the upper working portion of the printer 2. In this view, the removable build box 4 (not shown) has been removed and the recoater 6 has been moved forward to the edge of the opening 12 in the deck 14 through which the removable build box 4 would be visible when present.

Figure 3:
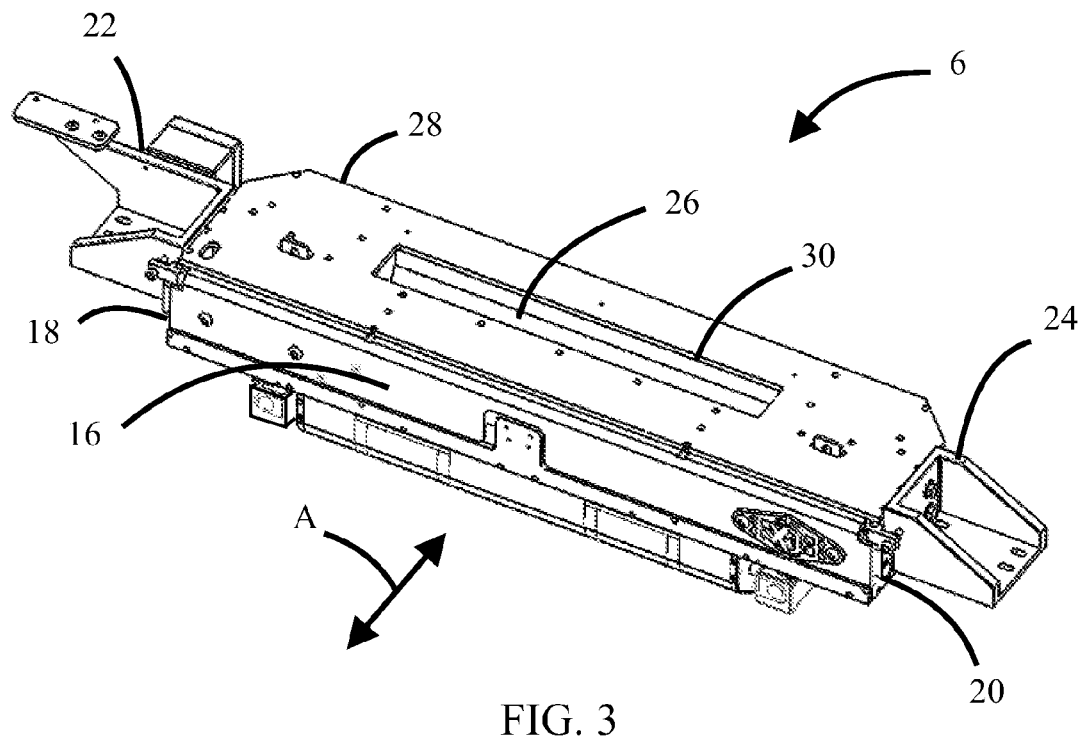
FIG. 3 is a perspective front view of a recoater embodiment.

FIG. 3 shows a perspective front view of the recoater 6. The recoater 6 has a bridge 16 having first and second ends 18, 20. The recoater also has first and second supports 22, 24 which are adapted to movably support the bridge 16. The recoater 6 also has a powder reservoir 26 which is adapted to contain a build powder (not shown) and to selectively dispense the build powder during the layer formation process. The recoater 6 is movable with respect to the powder bed that is to be formed by the dispensing of the build powder from the powder reservoir 26. The recoater 6 may be controllably moved by one or more drive mechanisms which are external to the recoater, integral to the recoater, or partially external and partially integral to the recoater. In preferred embodiments, a drive mechanism is connected to one of the first and second supports 22, 24 to controllably move the recoater 6 in the directions indicated by arrow A.

The recoater 6 also has a substantially rectangular plate 28 having an opening 30 through which build powder can be fed into the powder reservoir 26, e.g. by a powder supply source such as powder bin 32 (visible in FIG. 2) when the recoater 6 is in a powder receiving position relative to the powder supply source. The term "substantially rectangular" is to be construed herein as meaning that the plate, in the plan view, is geometrically rectangular or deviates from being geometrically rectangular by having one or more cut corners, bowings, indentations, holes, etc. The thickness of the plate 28 should be kept as thin as possible to minimize the overall weight and cost of the recoater 6, but preferably is no thinner than 0.5% of the length of the plate. The plate may be made of any stiff structural material, e.g. steel, stainless steel, nickel alloy, superalloy, titanium, aluminum, composite material, etc. Preferably the plate is made of a material having a modulus of elasticity of at least 68 gigaPascals, and more preferably at least 200 gigaPascals.

Figure 4:
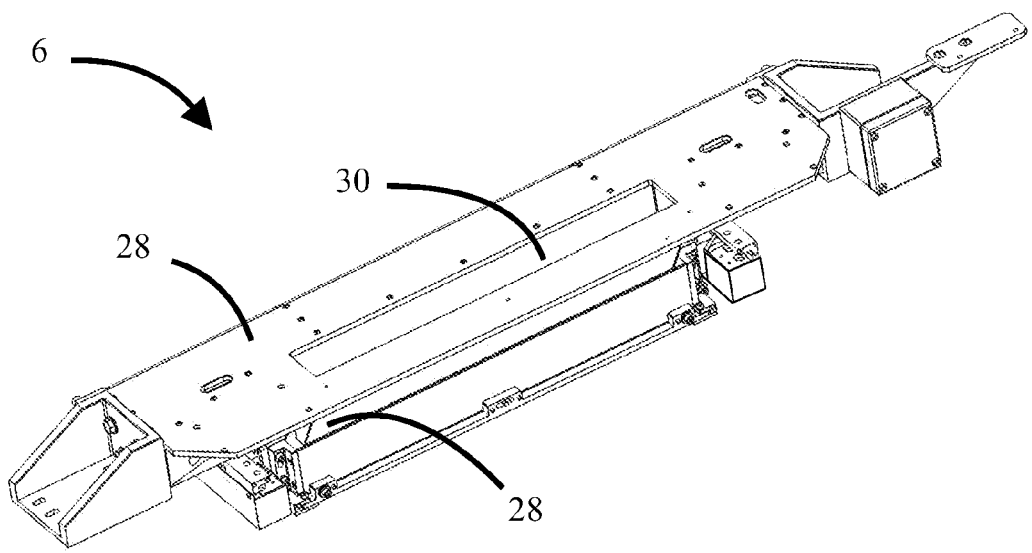
FIG. 4 is a perspective rear view of the recoater of FIG. 3.

FIG. 4 shows a perspective rear view of the recoater 6. The powder reservoir 26 is more easily seen in this figure than it was in FIG. 3, where only a portion of its inside was visible through the aperture 30 in the plate 28.

It is to be understood that embodiments of recoaters may include features which are in addition to those described above in relationship with FIGS. 2-4. Such features include, but are not limited to, vibration mechanisms for agitating and/or controlling the dispensing of the build powder, powder flow control mechanisms, e.g. controllable gates, labyrinth passageways, gaseous powder entrainment nozzles, etc., irradiation devices for irradiating the powder bed, heating or cooling mechanisms for controlling the temperature of the build powder within the powder reservoir, powder layer leveling devices, e.g. rotating rollers, doctor blades, etc., and sensors, e.g. proximity detectors, location sensors, temperature sensors, light sensors, humidity sensors, etc.

Figure 5:
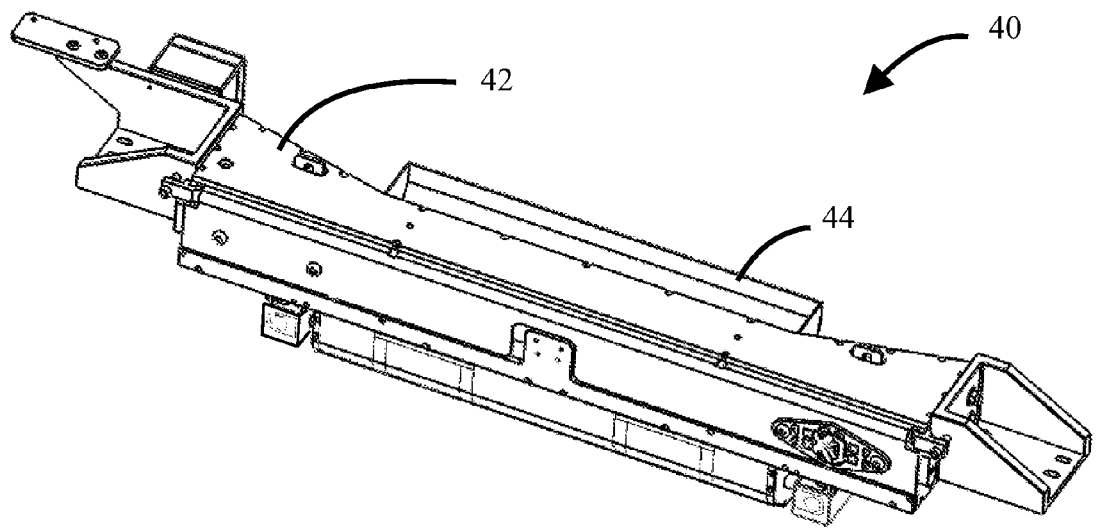
FIG. 5 is a perspective front view of a prior art recoater.

The inventors of the present invention made the surprising discovery that recoaters according to the present invention increased the uniformity of the deposited powder layer in comparison with a prior art recoater when build powders comprising a material having a high native density were being dispensed, i.e. native densities of 7 grams per cubic centimeter or greater. Referring now to FIG. 5, there is shown a prior art recoater 40 which is the same as the recoater 6 except that instead of plate 28, the prior art recoater 40 has prior art plate 42. Prior art plate 42 has the same length as does plate 28, the same thickness, i.e. about 0.8% of the plate length, and material of construction, i.e., Society of Automotive Engineers (SAE) Grade 4140 cold rolled steel. However, the length to minimum width ratio of prior art plate 42 is 12.2 whereas that of plate 28 is about 6.1 and the length to maximum width ratio of prior art plate 42 is about 7.4 whereas that of plate 28 is about 3.5. Also note that whereas plate 28 has the opening 30 through which a build powder can be loaded into the reservoir 26, the reservoir 44 in FIG. 5 extends beyond the prior art plate 42.

Figure 6:
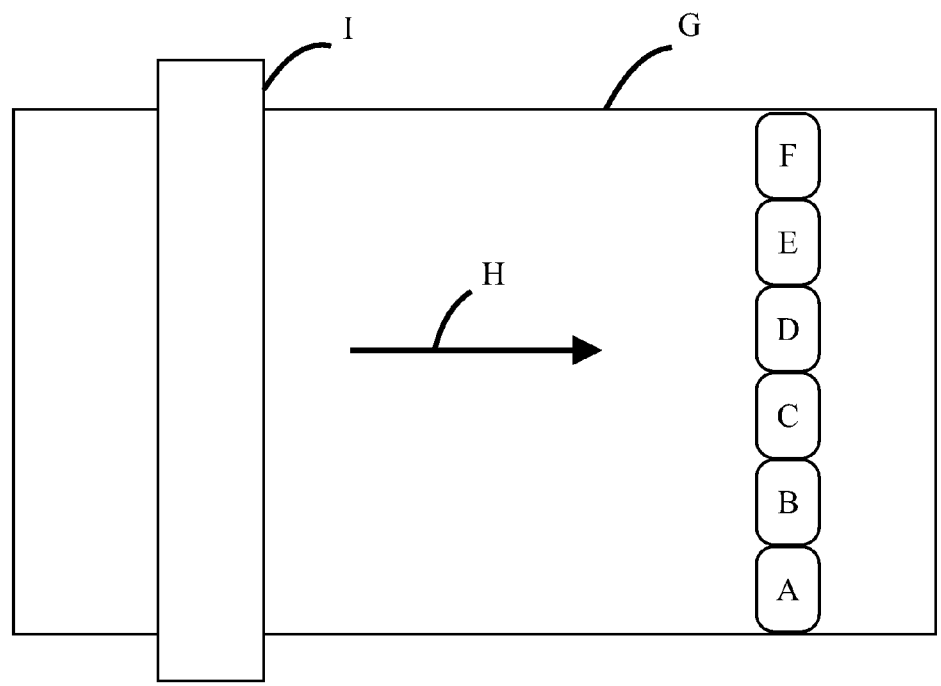
FIG. 6 is a schematic plan view of a build layer deposition uniformity test setup that was used to compare a recoater embodiment to a prior art recoater.

A comparison was made of the uniformity of build layer deposition of the inventive recoater 6 compared with that of the prior art recoater 40. The powder-layer three-dimensional printers used for the comparison were two M-Flex binder jet three-dimensional printers made by The ExOne Company, North Huntingdon, Pa. US 15642. One of the M-Flex printers included the inventive recoater 6 and the other included the prior art recoater 40. The build powder used was SAE grade 420 stainless steel powder having a nominal powder size of 30 microns. The SAE grade 420 stainless steel has a nominal native density of about 7.7 grams per cubic centimeter. The build layer deposition uniformity was measured by placing six collection containers A, B, C, D, E, F side by side across the width of a build box G as depicted schematically in FIG. 6. The arrow H indicates the direction of movement of the recoater (generally represented by rectangle I) during powder deposition. Each of the M-Flex printers was adjusted until its spreading uniformity conditions were optimized. Powder was then collected in the six collection containers.

Table I shows the results of the comparison. If the powder deposition was perfectly uniform, then each of the containers would have contained exactly one-sixth of the total amount of powder deposited. The number given in Table I for each container represents the deviation from perfect uniformity, i.e. one-sixth of the total collected, of the amount collected in that container, expressed as a percent. For example, if a total of 207.12 grams of powder was collected in the six containers, the perfect uniformity amount would be one-sixth of this amount, i.e. 34.52 grams. If 35.59 grams of powder was collected in Container A, then the deviation of the amount deposited in Container A from perfect uniformity would equal [(35.59-34.52)/34.52]×100%, i.e. 3.1%.

TABLE I

| | Container A | Container B | Container C | Container D | Container E | Container F |
|---|---|---|---|---|---|---|
| Embodiment | 2.3% | -3.4% | -1.3% | -1.6% | 1.9% | 2.1% |
| Prior Art | 7.0% | 6.2% | 4.9% | 1.4% | -5.0% | -14.5% |

Examination of Table I shows that the uniformity of the deposition of the powder was substantially better for the powder-layer three-dimensional printer having the inventive recoater than it was for the powder-layer three-dimensional printer having the prior art recoater.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

In terms which are to be construed as being no broader in scope than made explicit or implicit by the foregoing specification, what is claimed is:

1. A powder-layer three-dimensional printer comprising a recoater, wherein the recoater is movable and includes a bridge, first and second supports, a powder reservoir which is adapted to contain and selectively dispense a build powder, and a substantially rectangular plate extending between the first and second supports, wherein the plate has a length to minimum width ratio of no more than about 7.0 and a length to maximum width ratio of no more than about 5.0, the plate being adapted to brace the bridge into a perpendicular relationship with the first and second ends when the recoater is being moved and the powder reservoir is dispensing powder to form a powder layer, the plate having an opening adapted to permit the build powder to be loaded therethrough into the powder reservoir or for the powder reservoir to extend into or through the opening, and the first and second supports are located, respectively, at first and second ends of the bridge.

2. The powder-layer three-dimensional printer of claim 1, wherein one of the first and second support ends is connected to a drive mechanism, wherein the drive mechanism is adapted to controllably move the bridge section.

3. The powder-layer three-dimensional printer of claim 1, wherein the recoater is adapted for use with the build powder having a material having a native density of at least 7 grams per cubic centimeter.

4. A recoater adapted for use on a powder-layer three-dimensional printer, the recoater comprising a bridge, first and second supports, a powder reservoir which is adapted to contain and selectively dispense a build powder, and a substantially rectangular plate extending between the first and second supports, wherein the plate has a length to minimum width ratio of no more than about 7.0 and a length to maximum width ratio of no more than about 5.0, the plate being adapted to brace the bridge into a perpendicular relationship with the first and second ends when the recoater is being moved and the powder reservoir is dispensing powder to form a powder layer, the plate having an opening adapted to permit the build powder to be loaded therethrough into the powder reservoir or for the powder reservoir to extend into or through the opening, and the first and second supports are located, respectively, at first and second ends of the bridge.

5. The recoater of claim 4, wherein one of the first and second support ends is adapted to be connected to a drive mechanism which is adapted to controllably move the bridge section.

6. The recoater of claim 4, wherein the recoater is adapted for use with the build powder having a material having a native density of at least 7 grams per cubic centimeter.

* * * * *